United States Patent [19]
Nakabo

[11] Patent Number: 5,974,006
[45] Date of Patent: Oct. 26, 1999

[54] METHOD FOR READING CD-ROM

[75] Inventor: Takeshi Nakabo, Kanagawa, Japan

[73] Assignee: NEC Corporation, Tokyo, Japan

[21] Appl. No.: 08/910,011

[22] Filed: Aug. 12, 1997

[30] Foreign Application Priority Data

Aug. 23, 1996 [JP] Japan ................................ 8-222336

[51] Int. Cl.⁶ .................................................. G11B 17/22
[52] U.S. Cl. ............................................. 369/32; 369/58
[58] Field of Search .................................. 369/32, 54, 58, 369/124; 711/113, 137, 156, 144; 395/425, 471; 364/DIG. 1

[56] References Cited

U.S. PATENT DOCUMENTS

| | | | |
|---|---|---|---|
| 5,392,413 | 2/1995 | Nomura et al. | 395/425 |
| 5,829,017 | 10/1998 | Ohtsuka | 711/113 |

FOREIGN PATENT DOCUMENTS

| | | |
|---|---|---|
| 0 455 230 A2 | 11/1991 | European Pat. Off. . |
| 0 568 231 A1 | 11/1993 | European Pat. Off. . |
| 0 687 978 A2 | 12/1995 | European Pat. Off. . |
| 4-89671 | 3/1992 | Japan . |
| 5-135483 | 6/1993 | Japan . |
| 8-124179 | 5/1996 | Japan . |

OTHER PUBLICATIONS

Yoichi, S., "Store check system for cache memory controller," *Patent Abstracts of Japan*, Mar. 25, 1987.

Yoshinobu, T., "External storage controller," *Patent Abstracts of Japan*, Dec. 8, 1995.

Winterstein, B., "Cache design boosts SMD drive performance," *Computer Design*, Mar. 15, 1986, pp. 87–92.

*Primary Examiner*—Ali Neyzari
*Attorney, Agent, or Firm*—Whitham, Curtis & Whitham

[57] ABSTRACT

It is intended to shorten the read time after receiving a read command. The method comprises step S2 for determining whether or not a read request address for a new read command is identical to an address being currently read, step S4 for, if they are identical, outputting CD-ROM stored data RD held in a memory as read data against the read command after completion of the current read process, and step S6 for, if they are not identical, performing a seek operation, performing a read process after completion of the seek operation, and outputting the read data after completion of the read process.

10 Claims, 6 Drawing Sheets

METHOD FOR READING CD-ROM

BACKGROUND OF THE INVENTION

1. Field of the Invention

The present invention relates to a method for reading a read-only memory medium, and, more particularly, to a method for reading a read-only memory medium in a drive for reading a read-only memory medium such as a CD-ROM.

2. Prior Art

A read-only memory medium such as a compact disc (CD) or a CD-ROM is being widely used as an information recording medium for audio-visual (AV) or a computer as it has a large capacity and is easy to use.

As defined by the Japanese Industrial Standard JIS S 8605 which is the standard for CDs and CD-ROMs (hereinafter comprehensively "CD-ROMs"), the recording scheme for CD-ROM is to record bit information consisting of long and short bits on the disk in a spiral track consisting of sequential recesses (grooves) from the inner periphery to the outer periphery.

Figure 3:
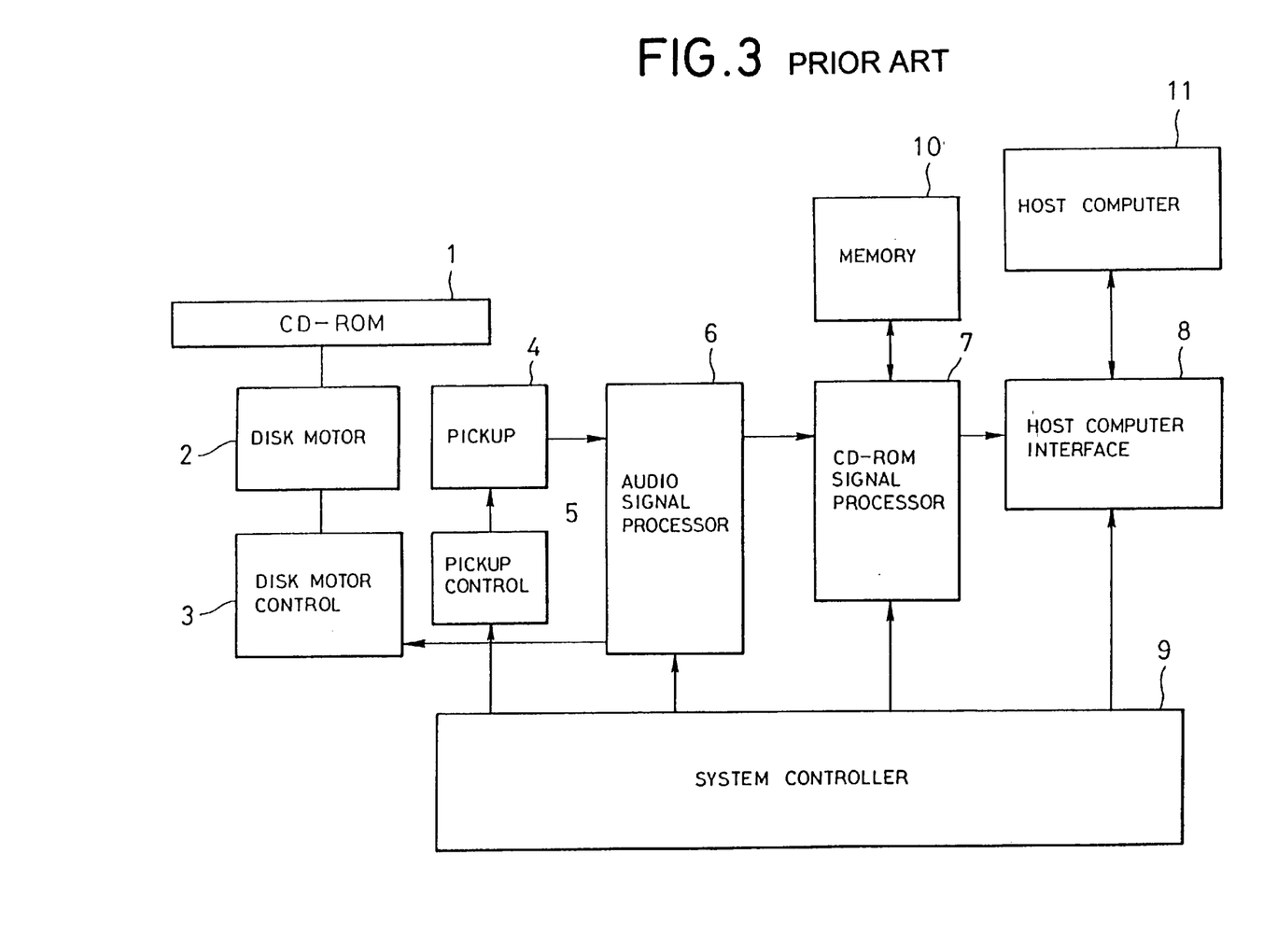
FIG. 3 is a block diagram showing an example of CD-ROM drives.

For example, referring to FIG. 3 which is a block diagram showing an overall structure of a conventional CD-ROM drive for reading a CD-ROM described in Japanese Patent Application Laid-Open No. 4-89671 (Reference 1), the CD-ROM drive comprises a CD-ROM 1, a disk motor 2 for rotatingly driving the CD-ROM 1, a disk motor control 3 for controlling the rotation speed of the disk motor 2, a pickup 4 for reading bit information from the CD-ROM 1 with a laser beam a pickup control 5 for controlling focusing and tracking of the pickup 4 and for controlling its movement, an audio signal processor 6 for decoding audio data and subcodes from the read bit information, a CD-ROM signal processor 7 for decoding CD-ROM data from the audio data, a host computer interface 8 for interfacing a host computer 11, a system controller 9 for controlling the entire CD-ROM drive, a memory 10, and the host computer 11.

Now, referring to FIG. 3, description is made on the operation of the CD-ROM drive. The disk motor control 3 controls the disk motor 2 so that the CD-ROM 1 can be rotated at a constant linear speed. The pickup control 5 controls focusing and tracking of the pickup 4 and its movement to read the bit information PD recorded on the CD-ROM 1 with the pickup 4. The audio signal processor 6 decodes the audio data A and the subcode S from the bit information PD, extracts a clock signal CK contained in the bit information PD, and supplies it to the disk motor control 3 as a feedback signal for controlling the rotation.

The CD-ROM signal processor 7 decodes the CD-ROM data from the audio data A, decodes a read block address which is an address assigned to the decoded CD-ROM data RD, and stores the CD-ROM data RD in the memory 10. In the following, called data read process is a series of operations and processing from reading of the bit information PD with the pickup 4 to outputting of the CD-ROM data RD and the read block address with the audio signal processor 6 and the CD-ROM signal processor 7.

The host computer interface 8 performs interfacing with the host computer 11 which acquires stored data in the CD-ROM 1 with the CD-ROM drive. That is, it supplies a read command RC provided by the host computer 11 which command is a command for reading the recorded data in the CD-ROM 1 to the system controller 9, and transfers the CD-ROM data RD decoded by the CD-ROM signal processor 7 to the host computer 11. The system controller 9 moves the pickup 4 to a location close to a read start block address specified by the read command RC with the pickup control 5. Then, it performs the data read process, compares the read start block addresses to detect a block specified by the read start block address, and transfers the CD-ROM data RD in the block to the host computer 11. Then, the data read process is continued to transfer the CD-ROM data in the number of read blocks specified by the read command one block after another to the host computer 11. In the following, called a seek operation is a series of operations and processing for detection of blocks at the specified block addresses by the movement of the pickup 4 and the data read process.

The system controller 9 performs the seek operation in response to the read command RC, and then transfers the read CD-ROM data RD to the host computer 11. After the transfer of CD-ROM data RD, the system controller 9 continues the data read process, and stores data recorded in the CD-ROM 1 one block after another in the memory 10 from an address following the read end address of the CD-ROM data RD transferred to the host computer 11. When the memory 10 becomes full, the system controller 9 terminates the data read process through the audio signal processor 6 and the pickup controller 5. In the following, called a buffering operation is the operation for storing the CD-ROM data RD in the memory 10 after transfer of the CD-ROM data RD to the host computer Now, description is given on the operation of a first conventional method for reading a read-only memory medium with the CD-ROM drive by referring to FIG. 4 which is a flowchart for processing of an execution program for the system controller 9. First, the system controller 9 starts the read operation in response to receipt of a read command from the host computer 11 (step S1). It determines whether or not data for the address requested by the read command has been stored in the memory 10 (step S2). If so, it starts transfer of the data to the host computer 11. If the data has not been stored, it starts the seek process (step S4). After completion of the seek process, it starts the data read process (step S5), and starts transfer of the data to the host computer 11 after completion of the data read process (step S6). Once the data transfer completes, it returns the completion status of the read command for the data stored in the CD-ROM to the computer 1 (step S7). It starts the buffering process from the time when the CD-ROM drive completes the read process (step S8) to read data until the memory 10 becomes full.

Figure 4:
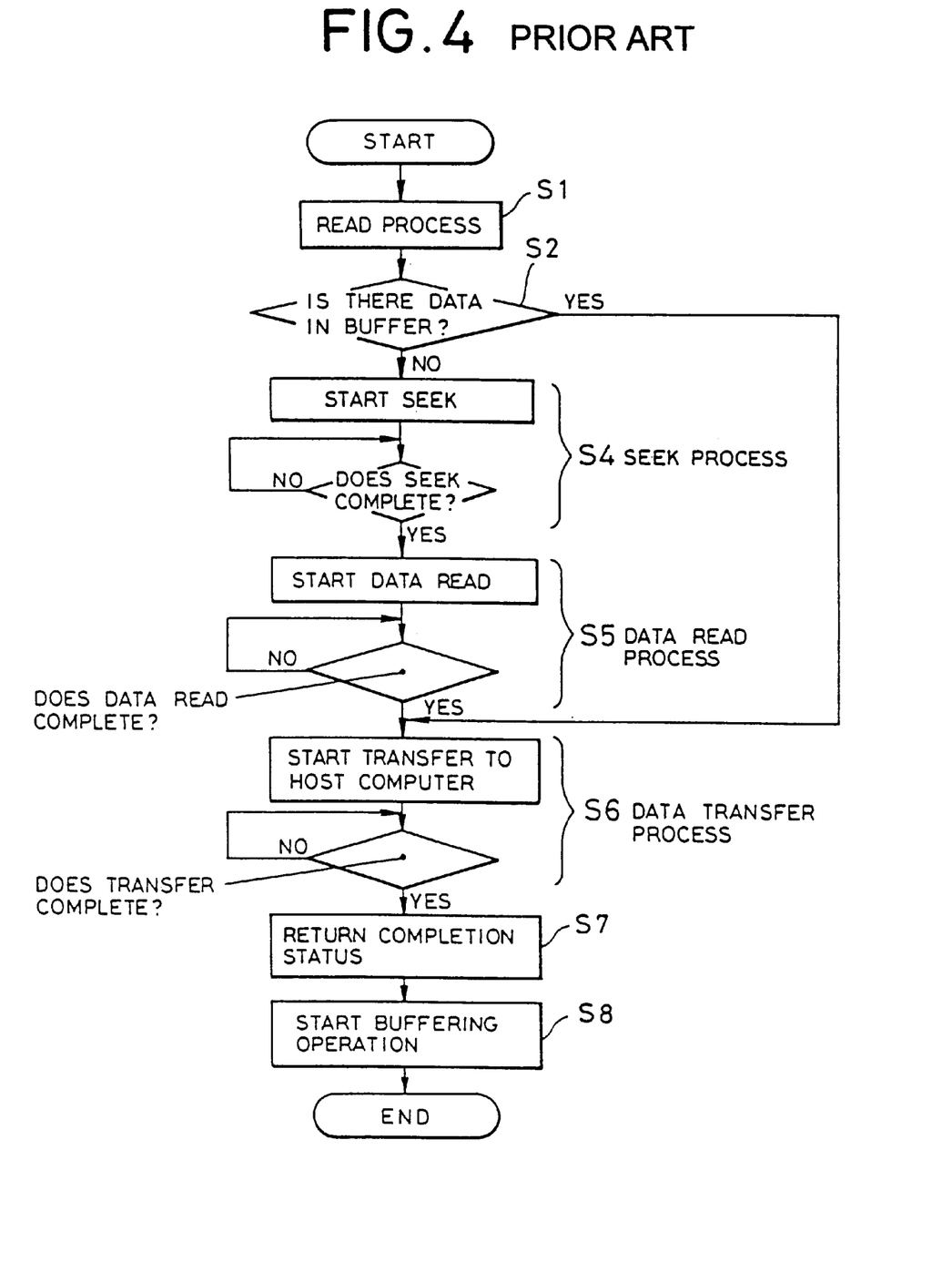
FIG. 4 is a flowchart showing a first conventional method for reading a read-only memory medium.

The first method for reading the read-only memory medium performs the buffering process after returning the read data at any address as described above. In a case where a read command for an address following the returned read data arrives, and read data for the next address is not yet stored, the seek operation is always performed regardless of the current state of the drive because of no stored data. When the seek operation is performed, even if the drive is reading the same address, the read process is terminated and the same address is read again from its top, so that the data return time is as long as 100 ms.

Figure 5:
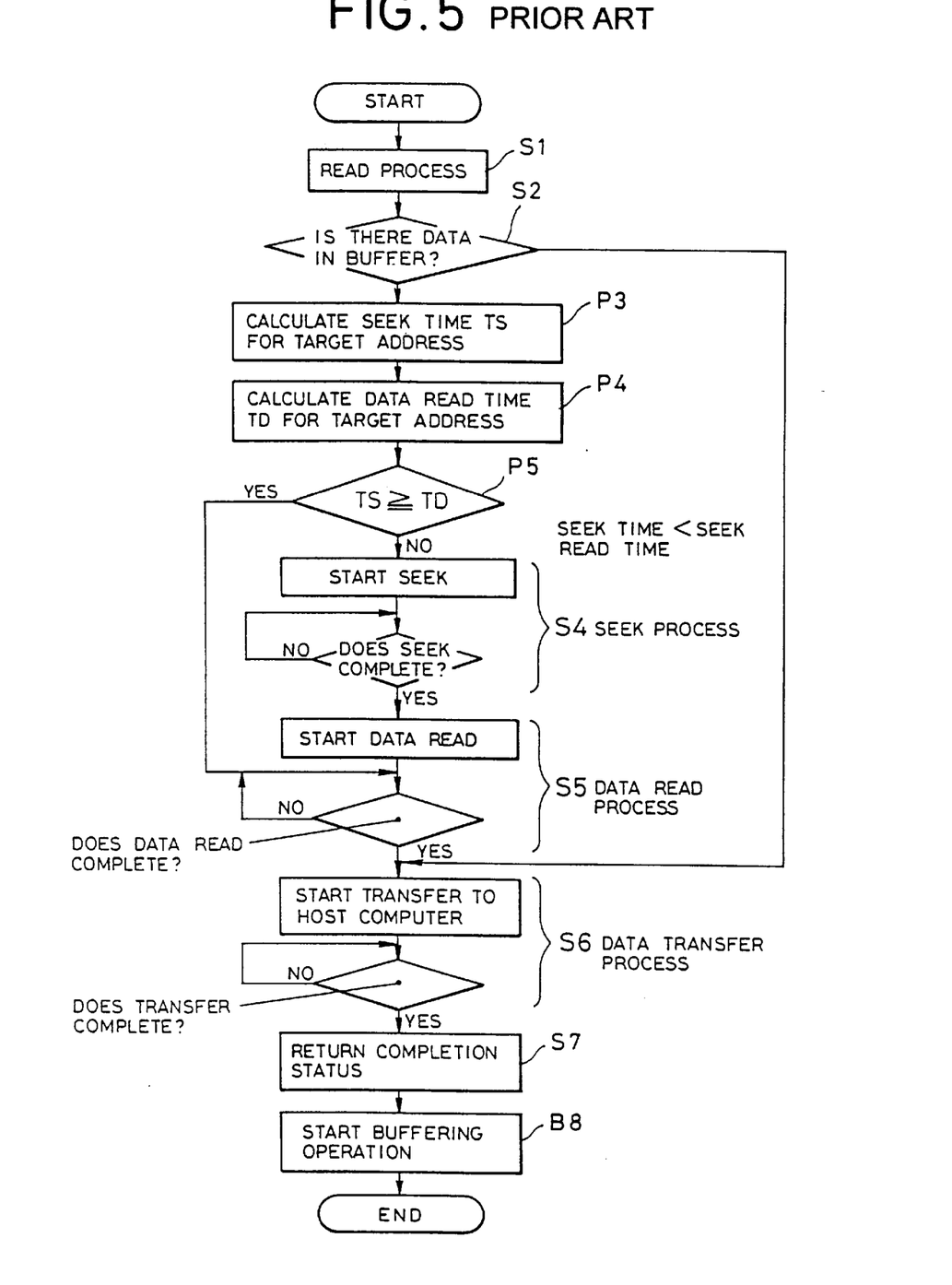
FIG. 5 is a flowchart showing a second conventional method for reading a read-only memory medium.

Now, description is given on a second conventional method for reading a read-only memory medium which is improved for the above problems by referring to FIG. 5 which shows its flow chart with the same reference characters/numerals for the same components as in FIG. 4. This method shown in this figure differs from the first conventional method described above in that the second method additionally has between steps S2 and S4 step P3 for calculating seek time TS to a target address, step P4 for calculating data read time TR to the target address, and step P5 for determining which of the process time in steps P3 and P4 is longer.

Now, the processing operation is described with reference to FIG. 5. Similar to the first conventional method, the system controller 9 starts the read process in response to receipt of a read command (step S1), and determines whether or not data at the requested address has been stored in the memory 10 (step S2). If so, it proceeds to step S6 where it starts transfer of the data to the host computer 11. If the data has not been stored, it starts the seek operation from the current state, and calculates the seek time TS to the start of reading the requested CD-ROM data (step P3). In addition, if the current state is in the read process of data, it continues reading of data as is, and calculates the data read time TR to the start of the requested CD-ROM data (step P4). After the calculation, the seek time TS is compared with the data read time TR (step P5). If the seek time TS is shorter, the seek operation is performed (step S4). Thereafter, it performs the data read process (step S5), and transfers the data to the read host computer 11 (step S6). If the data read time TR is shorter, it continues the data read process as is, and transfers the data to the host computer 11 (step S6). Then, as in the first conventional method, at the completion of data transfer, it returns the completion status of the read command (step S7), and performs the buffering process (step S8).

As an example, it is assumed that the read command requests to read an address at 100 addresses ahead. If the seek time TS is calculated as 200 ms to read the requested address by performing the seek operation from the current state, and the read time TR is calculated as 340 ms to read the requested address by reading data from the current state as is, the seek time TS is shorter than the read time TR, so that the seek operation is performed. In addition, it is assumed that it is requested to read an address at 10 addresses ahead. If the seek time TS is calculated as 190 ms from the current state, and the read time TR is calculated as 34 ms from the current state, the read time TR is shorter than the seek time TS, so that the data read process is continued.

Figure 6:
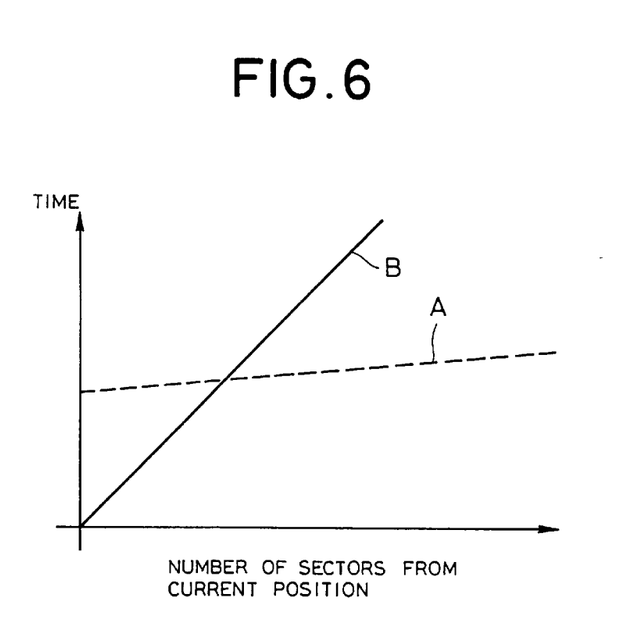
FIG. 6 is a graph showing the relationship between time required for reading data and a current reading position.

Referring to FIG. 6 which schematically shows seek time TS (line A) from the current state origin and read time TR performing data reading as is (line B), it is found that, if the address to be read next from the CD-ROM 1 is close to the current location, reading can be more quickly performed by continuing the data read process being currently performed, and that, if the address to be read next from the CD-ROM is farther than the current location, reading can be more quickly performed by performing the seek operation.

However, since there is a comparison/determination process for the processing time of the seek time TS and the read time TR, the capacity of a required program is increased.

Figure 7:
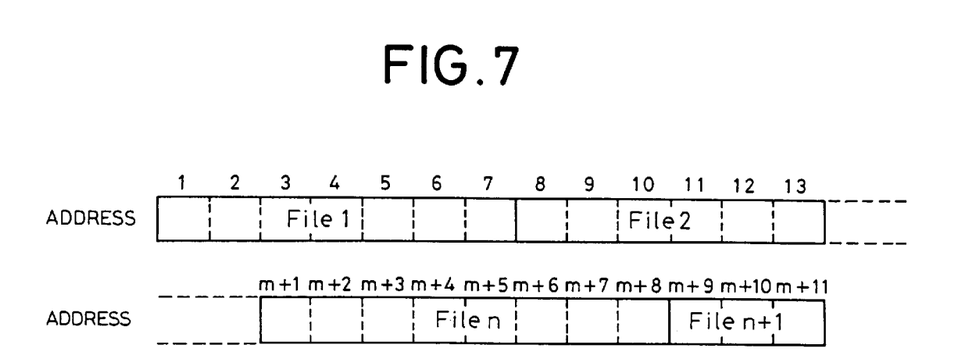
FIG. 7 is a schematic diagram showing a file arrangement in a CD-ROM.

Referring to FIG. 7 which schematically shows a file structure in the CD-ROM 1, the CD-ROM data is recorded at sequential addresses by file. While the current operation is to read the data, if the host computer 11 reads another file, data is read in the order of addresses sequential from the current data just read. In this case, it is obvious that the processing time is shorter when performing data reading than performing the seek operation.

It is because, in the case of a typical CD-ROM, the seek time is in a range of 150 ms–250 ms during which a quadruple speed CD-ROM drive can read only 45–60 sectors, so that the file read process rarely reads an address at 40–60 sectors ahead from the address read by the current read command.

In addition, when a plurality of files are copied to the host computer 11, which of the seek time and the read time is shorter is compared and determined upon receipt of a read command for a stored address of data of another file after one file is copied. In this case, since there is no limitation of address assignment between both files as in the read process, in most cases, the seek time is determined to be shorter.

Therefore, the comparison and determination on the seek and the read time can be said to be a redundant process in the second conventional method for reading a read-only memory medium.

Since the first conventional method for reading a read-only memory medium as described above always performs the seek operation upon receipt of a read command regardless of the current state of the drive, there is a disadvantage that it takes a long period of time from the time when the host computer issues the read command to the time when CD-ROM data is returned.

In addition, since the second conventional method for reading a read-only memory medium has a redundant process for comparison and determination of the processing time of the seek and the read time, there is a disadvantage that the capacity of required program is increased.

SUMMARY OF THE INVENTION

Thus, an object of the present invention is to provide a method for reading a read-only memory medium which shortens the period of time from issuance of a read command to return of CD-ROM data, and which does not require comparison and determination on processing time for seek and read time.

According to a first aspect of the present invention, there is provided a method for reading a read-only memory medium, the method reading data stored on the read-only memory medium through temporary storage means, the method comprising:

a first step for determining whether or not the stored data at an address of read request newly generated is already stored in the temporary storage means;

if the determination in the first step reveals that the stored data is not stored in the temporary storage means, a second step for determining whether or not the temporary storage means is reading the stored data;

if the determination in the second step reveals that it is reading the stored data, a third step for continuing reading of the data as is, and starting output of the read data at the completion of the data read process; and if the determination in the second step reveals that it is not reading the stored data, a fourth step for starting a seek process, and starting output of data read from the read-only memory medium upon the completion of the seek process.

According to a second aspect of the present invention, the method for reading a read-only memory medium as set forth in the first aspect further comprises a fifth step for reading in ascending order the stored data from the read-only memory medium from an address next to the address of read request newly generated after the output of data in the third and fourth step to the temporary storage means.

According to a third aspect of the present invention, in the method for reading a read-only memory medium as set forth in the first aspect, the determination in the second step is attained by comparing the address of read request newly generated and a transfer start address in the temporary storage means for their significance.

According to a fourth aspect of the present invention, in the method for reading a read-only memory medium as set forth in the third aspect, if the address of read request newly generated is higher than or equal to the transfer start address, it is determined that the temporary storage means is in the process for reading the stored data.

According to a fifth aspect of the present invention, in the method for reading a read-only memory medium as set forth in the fourth aspect, if the address of read request newly generated is equal to the transfer start address, data is read in sequence from the transfer start address from the temporary storage means.

According to a sixth aspect of the present invention, in the method for reading a read-only memory medium as set forth in the fourth aspect, if the address one ahead of read request newly generated is larger than the transfer start address, addresses are erased from the transfer start address to the address one ahead of read request newly generated, remaining addresses being read from the temporary storage means.

According to a seventh aspect of the present invention, if the address of read request newly generated is smaller than the transfer start address, the method for reading a read-only memory medium as set forth in the fourth aspect further comprises a sixth step for erasing the data stored in the temporary storage means.

According to an eighth aspect of the present invention, the method for reading a read-only memory medium as set forth in the seventh aspect performs the fourth step after the data stored in the temporary storage means is erased.

According to a ninth aspect of the present invention, in the method for reading a read-only memory medium as set forth in the first aspect, if the determination in the first step reveals the stored data is stored in the temporary storage means, the stored data is read and output.

According to a tenth aspect of the present invention, in the method for reading a read-only memory medium as set forth in the first aspect, the read-only memory medium is a CD-ROM.

DESCRIPTION OF THE PREFERRED EMBODIMENTS

Figure 1:
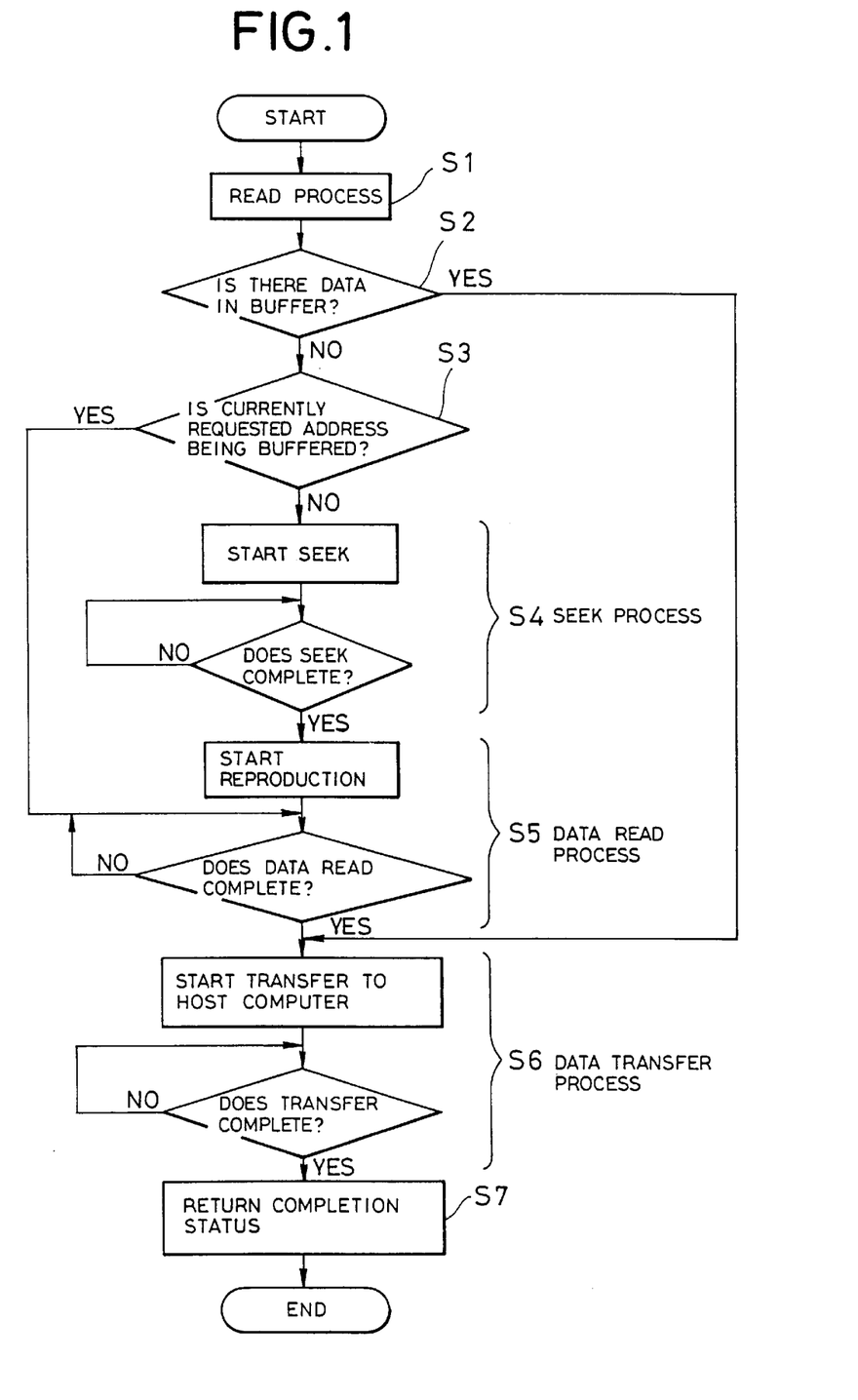
FIG. 1 is a flowchart showing an embodiment of a method for reading a read-only memory medium according to the present invention.

Now, referring to FIG. 1 which is a flowchart showing an embodiment of the present invention with similar reference characters/numerals for components common to FIG. 3, the method for reading a read-only memory medium according to the embodiment of the present invention shown in FIG. 1 comprises step S3 for determining whether or not an address currently read requested is being buffered between the common steps S2 and S4, in addition to the process in common Steps S1 and S2 and the process in common steps S4–S7.

Now, referring to FIGS. 1 and 3, the operation of the embodiment is described. As in the prior art, a system controller 9 starts a read process in response to receipt of a read command froma hostcomputer 11 (step Sl), determines whether or not data at the requested address has been stored in a memory 10 (step S2), and, if the data has been stored, proceeds to step S6 to start transfer of the data to the host computer 11.

Here, if the data at the requested address does not exist in the memory 10, it is determined whether or not data at an address requested by the read command or a read requested address is being read or buffered (step S3). If the data is being read, it continues reading of the data as is, and waits for storing of the data. If the data at the read requested address is not being read, it proceeds to step S4 to perform a seek process. Upon completion of the seek process, it performs a data read process (step S5) to read data, and transfers the data to the host computer 11 (step S6). Then, as in the first conventional method, upon completion of the data transfer, it returns a read command completion status (step S7), and terminates the process.

Figure 2:
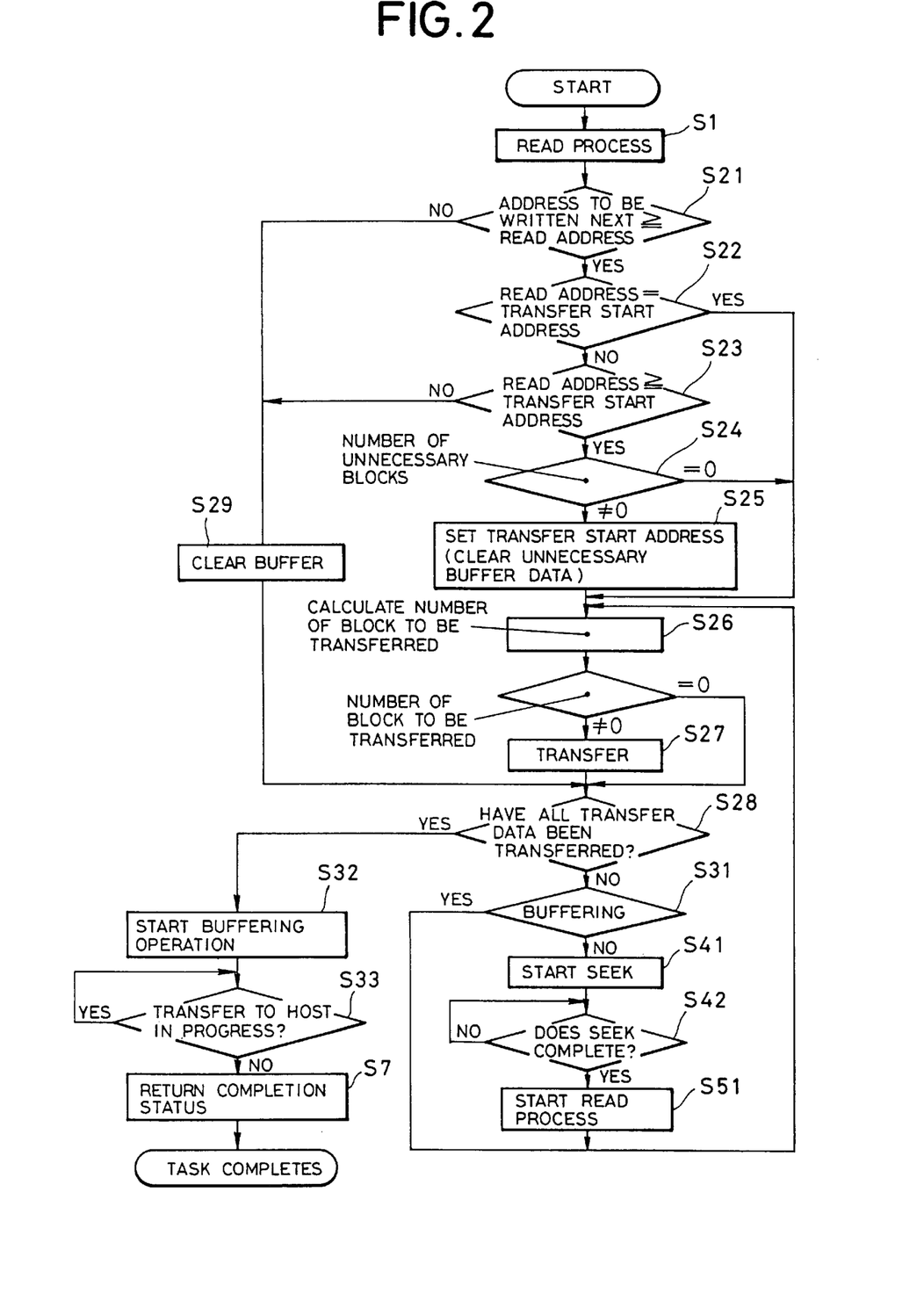
FIG. 2 is a flowchart showing in detail the method for reading a read-only memory medium of the embodiment.

Now, description is given in detail on the operation of the embodiment by referring to FIG. 2 which is a flowchart showing the detail of the process shown in FIG. 1. In response to receipt of a read command from the host computer 11, the system controller 9 starts the read process (step S1). It is determined whether the received read address is smaller than or equal to an address to be written next in the buffer by the system controller 9 (step S21). If it is neither equal nor smaller, it proceeds to step S29 where writing in the buffer is terminated. If it is smaller or equal, it is determined whether or not an address next to transfer to the host computer 11 (hereinafter called a "transfer start address) matches the received read address (step S22). If matched, it proceeds to step S26 where the number of transferred blocks is counted. If it is not zero, it means the read data is stored in the memory 10, so that the transfer is started (step S27). On the other hand, if the number of transferred blocks is zero, it means that the read data is not stored in the memory 10, so that it waits for storing of read data, and starts transfer of data to the host computer 11. If there is no match in step S22, it compares the read address with the transfer start address (step S23), and starts the transfer start address as the read address if the transfer start address is the smaller (step S25).

With steps S21–S27 above, it starts transfer in the number of blocks requestedby the host computer 11 (step S28), and then performs buffering to sequentially read data from an address next to the requested read address to the memory 10 (step S32). Then, it waits for completion of the transfer (step S33), and returns the completion status (step S7).

Then, description is given on the process where there is no read data at the requested address in the memory 10 when the read command is received from host computer 11.

First, in step S21, it compares the next write address with the read address. If the read address is the larger, or if the result of comparison in step S21 reveals that the read address is the larger, but the comparison between the read address and the transfer start address in step S23 shows that the transfer start address is the larger, data read out from unnecessary addresses is stored in the memory 10, so that it clears the memory 10 in step S29, starts the seek process in step S41, and starts the read process upon completion of the seek process (step S51).

Then, actual operation is specifically described by referring to FIG. 3 again. First, description is given on a case where read data to be returned exists in the memory 10 when the read command is received from the host computer 11. For the convenience of description, it is assumed that a read command at reading address No. 110 is received when data up to address No. 99 is returned to the host computer 11 by the last read command, and the subsequent buffering stores CD-ROM data RD at address No. 100 to address No. 120 in the memory 10.

When the read command is received, it compares the next write address No. 121 and the read address No. 110 in step S21. If the read address is the smaller, it compares the read address No. 110 with a transfer start address No. 100. Since they do not match, it compares the read address No. 110 with the transfer start address No. 100 in step S23. Since the read address is the larger, the number of unnecessary blocks is calculated. As described above, since addresses Nos. 100 to 120 exist in the memory 10, and data from address No. 110 is transferred to the host computer 11, blocks for ten addresses from address No. 100 become unnecessary blocks. Then, the unnecessary blocks are erased in step S25, the transfer start address at address No. 100 is reset at address No. 110 for the read address, and the data is transferred to the host computer 11 (step S27).

Now, description is given on a case where read data to be returned does not exist in the memory 10 when the read command is received. Here, it is assumed that a read command at address No. 150 exceeding the read data storage range is received when, as in the above case, data up to address No. 99 is returned to the host computer 11 by the last read command, and the subsequent buffering stores CD-ROM data RD at address No. 100 to address No. 120 in the memory 10.

When the read command is received, it compares the next write address No. 121 with the read address No. 150 in step S21. Since the read address is the larger, it clears the write data storage memory 10 in step S29, and performs the seek operation for the read address No. 150 in step S41. Upon completion of the seek operation (step S42), it reads data from the read address No. 150 (step 51), and transfers the data to the host computer 11 from the time when the read data is stored in the memory 10 (step S26).

Now, description is given on a process where the intervals between received read commands is shorter than the period of time required for reading data of one block on a CD-ROM. Here, it is assumed that data up to address No. 99 is returned to the host computer 11 by the last read command, the next read command is a command for reading the address No. 100, and the receiving timing of this command is before the buffering process reads data at the address No. 100.

While the data at the address No. 99 is being returned to the host computer 11, and the buffering operation (steps S32 and S33) is being performed, when a read command for the address No. 100 is received by the completion of storage of data at the address No.100, it compares the next write address No. 100 with the read address No. 100 in step S21. Then, both addresses match, and it compares the read address No. 100 with the transfer start address No. 100 in step S22. Here, since both match again, it waits for data at the address No. 100 to be stored in the memory 10 in step S32 without performing the seek operation. At the moment when the data at the address No. 100 is stored in the memory 10, it transfers the read data to the host computer 11 (step S33).

As described above, the method for reading a read-only memory medium has an advantage that the time from receipt of a read command to returning of CD-ROM data can be shortened because it determines whether or not a new read request address is identical to an address being currently read processed; if so, outputs stored data held in temporary storage means as the read address to the read request upon completion of the current read process; if not, receives a read command for an address next to the returned address for performing a seek operation; and, if the read data of the next read address is not stored in a memory, does not perform the seek operation by waiting for storing of the read data.

In addition, it does not require a redundant process for comparing and determining processing time for seek time and read time, so that a factor to increase the capacity of a required program can be eliminated.

What is claimed is:

1. A method for reading a read-only memory medium, said method reading data stored on the read-only memory medium through temporary storage means, the method comprising:

a first step for determining whether or not said stored data at an address of read request newly generated is already stored in said temporary storage means;

if the determination in said first step reveals that said stored data is not stored in said temporary storage means, a second step for determining whether or not said temporary storage means is reading said stored data;

if the determination in said second step reveals that it is reading said stored data, a third step for continuing reading of the data as is, and starting output of said read data at the completion of said data read process; and if the determination in said second step reveals that it is not reading said stored data, a fourth step for starting a seek process, and starting output of data read from the read-only memory medium upon the completion of the seek process.

2. The method for reading a read-only memory medium as set forth claim 1 further comprises a fifth step for reading in ascending order said stored data from said read-only memory medium from an address next to said address of read request newly generated after the output of data in said third and fourth step to said temporary storage means.

3. The method for reading a read-only memory medium as set forth claim 1, wherein the determination in said second step is attained by comparing the address of read request newly generated and a transfer start address in said temporary storage means for their significance.

4. The method for reading a read-only memory medium as set forth claim 3, wherein, if said address of read request newly generated is higher than or equal to said transfer start address, it is determined that said temporary storage means is in the process for reading said stored data.

5. The method for reading a read-only memory medium as set forth claim 4, wherein, if said address of read request newly generated is equal to said transfer start address, data is read in sequence from said transfer start address from the temporary storage means.

6. The method for reading a read-only memory medium as set forth claim 4, wherein, if said address one ahead of read request newly generated is larger than said transfer start address, addresses are erased from said transfer start address from said address one ahead of read request newly generated, remaining addresses being read from said temporary storage means.

7. The method for reading a read-only memory medium as set forth claim 4, if said address of read request newly generated is smaller than said transfer start address, further comprises a sixth step for erasing the data stored in said temporary storage means.

8. The method for reading a read-only memory medium as set forth claim 7 performing said fourth step after the data stored in said temporary storage means is erased.

9. The method for reading a read-only memory medium as set forth claim 1, wherein, if the determination in said first step reveals the stored data is stored in said temporary storage means, said stored data is read and output.

10. The method for reading a read-only memory medium as set forth claim 1, wherein said read-only memory medium is a CD-ROM.

\* \* \* \* \*